United States Patent
Paczkowski et al.

(10) Patent No.: US 8,667,607 B2
(45) Date of Patent: Mar. 4, 2014

(54) TRUSTED SECURITY ZONE ACCESS TO PERIPHERAL DEVICES

(75) Inventors: Lyle W. Paczkowski, Mission Hills, KS (US); William M. Parsel, Overland Park, KS (US); Carl J. Persson, Olathe, KS (US); Matthew C. Schlesener, Shawnee, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 0 days.

(21) Appl. No.: 13/556,200

(22) Filed: Jul. 24, 2012

(65) Prior Publication Data

US 2014/0033316 A1 Jan. 30, 2014

(51) Int. Cl.
*G06F 13/00* (2006.01)
*G06F 17/30* (2006.01)

(52) U.S. Cl.
USPC .............. 726/27; 726/26; 711/100; 711/152; 711/163

(58) Field of Classification Search
USPC ................... 726/26, 27; 711/100, 152, 163
See application file for complete search history.

(56) References Cited

U.S. PATENT DOCUMENTS

| | | | |
|---|---|---|---|
| 5,303,378 A | | 4/1994 | Cohen |
| 6,668,322 B1 | | 12/2003 | Wood et al. |
| 6,824,064 B2 | | 11/2004 | Guthery et al. |
| 6,895,234 B1 | | 5/2005 | Laursen et al. |
| 7,650,645 B1 * | | 1/2010 | Langendorf et al. ............ 726/27 |
| 8,238,823 B2 | | 8/2012 | Maugars et al. |
| 8,494,576 B1 | | 7/2013 | Bye et al. |
| 8,504,097 B1 | | 8/2013 | Cope et al. |
| 2002/0194496 A1 | | 12/2002 | Griffin et al. |
| 2004/0243810 A1 * | | 12/2004 | Rindborg et al. ............. 713/176 |
| 2005/0015601 A1 | | 1/2005 | Tabi |
| 2005/0235166 A1 | | 10/2005 | England et al. |
| 2006/0036851 A1 | | 2/2006 | DeTreville |
| 2006/0212853 A1 | | 9/2006 | Sutardja |
| 2006/0224901 A1 | | 10/2006 | Lowe |
| 2006/0261949 A1 | | 11/2006 | Kim et al. |
| 2006/0277433 A1 * | | 12/2006 | Largman et al. ................. 714/15 |

(Continued)

FOREIGN PATENT DOCUMENTS

WO 2013170228 A2 11/2013

OTHER PUBLICATIONS

FAIPP Pre-Interview Communication dated Oct. 24, 2012, U.S. Appl. No. 13/463,797, filed May 3, 2012.

(Continued)

*Primary Examiner* — Beemnet Dada
*Assistant Examiner* — Kalish Bell

(57) ABSTRACT

A method of trusted data communication. The method comprises executing a data communication application in a trusted security zone of a processor, wherein the processor is a component of a computer, commanding a controller of a peripheral device to execute a control application in a trusted security zone of the controller, wherein the controller is a component of the computer, commanding at least one of another peripheral device or a user interface device to not access a data bus of the computer, verifying that the controller is executing the control application in the trusted security zone of the controller, sending data from the processor to the controller over the data bus of the computer, and the controller one of transmitting the data sent by the processor on an external communication link, reading a memory storage disk, or writing to a memory storage disk.

20 Claims, 7 Drawing Sheets

(56) References Cited

U.S. PATENT DOCUMENTS

| | | | |
|---|---|---|---|
| 2007/0061535 A1* | 3/2007 | Xu et al. | 711/167 |
| 2007/0079120 A1 | 4/2007 | Bade et al. | |
| 2007/0177771 A1 | 8/2007 | Tanaka et al. | |
| 2007/0186212 A1 | 8/2007 | Mazzaferri et al. | |
| 2007/0197261 A1 | 8/2007 | Humbel | |
| 2007/0214332 A1* | 9/2007 | Sonoda et al. | 711/163 |
| 2007/0277223 A1 | 11/2007 | Datta et al. | |
| 2008/0014867 A1 | 1/2008 | Finn | |
| 2008/0022374 A1 | 1/2008 | Brown et al. | |
| 2008/0162361 A1 | 7/2008 | Sklovsky | |
| 2008/0176538 A1 | 7/2008 | Terrill et al. | |
| 2008/0188178 A1 | 8/2008 | Maugars et al. | |
| 2008/0201212 A1 | 8/2008 | Hammad et al. | |
| 2009/0055278 A1 | 2/2009 | Nemani | |
| 2009/0113425 A1 | 4/2009 | Ports et al. | |
| 2009/0281947 A1 | 11/2009 | Erel | |
| 2009/0320028 A1 | 12/2009 | Gellerich et al. | |
| 2010/0031325 A1 | 2/2010 | Maigne et al. | |
| 2010/0052844 A1 | 3/2010 | Wesby | |
| 2010/0128598 A1 | 5/2010 | Gandhewar et al. | |
| 2010/0142517 A1 | 6/2010 | Montemurro et al. | |
| 2010/0162028 A1 | 6/2010 | Frank et al. | |
| 2010/0223348 A1 | 9/2010 | Przybysz et al. | |
| 2010/0274726 A1 | 10/2010 | Florek et al. | |
| 2011/0014948 A1 | 1/2011 | Yeh | |
| 2011/0021175 A1 | 1/2011 | Florek et al. | |
| 2011/0035604 A1 | 2/2011 | Habraken | |
| 2011/0078081 A1 | 3/2011 | Pirzadeh et al. | |
| 2011/0212707 A1 | 9/2011 | Mahalal | |
| 2011/0226853 A1 | 9/2011 | Soh et al. | |
| 2011/0237190 A1 | 9/2011 | Jolivet | |
| 2011/0281558 A1 | 11/2011 | Winter | |
| 2011/0294418 A1 | 12/2011 | Chen | |
| 2012/0011572 A1 | 1/2012 | Chew et al. | |
| 2012/0021683 A1 | 1/2012 | Ma et al. | |
| 2012/0028575 A1 | 2/2012 | Chen et al. | |
| 2012/0052801 A1 | 3/2012 | Kulkarni | |
| 2012/0084211 A1 | 4/2012 | Petrov et al. | |
| 2012/0143703 A1 | 6/2012 | Wall et al. | |
| 2012/0149327 A1 | 6/2012 | Raboisson et al. | |
| 2012/0158467 A1 | 6/2012 | Hammad et al. | |
| 2012/0159163 A1 | 6/2012 | von Behren et al. | |
| 2012/0159612 A1 | 6/2012 | Reisgies | |
| 2012/0178365 A1 | 7/2012 | Katz et al. | |
| 2012/0178366 A1 | 7/2012 | Levy et al. | |
| 2012/0190332 A1 | 7/2012 | Charles | |
| 2012/0202423 A1 | 8/2012 | Tiedemann et al. | |
| 2012/0238206 A1 | 9/2012 | Singh et al. | |
| 2012/0252480 A1 | 10/2012 | Krutt et al. | |
| 2012/0258690 A1 | 10/2012 | Chen et al. | |
| 2012/0266220 A1 | 10/2012 | Brudnicki et al. | |
| 2012/0295588 A1 | 11/2012 | Chen et al. | |
| 2012/0297187 A1 | 11/2012 | Paya et al. | |
| 2013/0054474 A1 | 2/2013 | Yeager | |
| 2013/0062417 A1 | 3/2013 | Lee et al. | |
| 2013/0109307 A1 | 5/2013 | Reisgies et al. | |
| 2013/0117186 A1 | 5/2013 | Weinstein et al. | |
| 2013/0138521 A1 | 5/2013 | Want et al. | |
| 2013/0138959 A1 | 5/2013 | Pelly et al. | |
| 2013/0140360 A1 | 6/2013 | Graylin | |
| 2013/0143489 A1 | 6/2013 | Morris et al. | |
| 2013/0174147 A1 | 7/2013 | Sahita et al. | |
| 2013/0305333 A1 | 11/2013 | Katzer et al. | |

OTHER PUBLICATIONS

Notice of Allowance dated Mar. 1, 2013, U.S. Appl. No. 13/463,797, filed May 3, 2012.

FAIPP Pre-Interview Communication dated Jun. 12, 2013, U.S. Appl. No. 13/440,980, filed Apr. 5, 2012.

FAIPP Pre-Interview Communication dated Oct. 24, 2012, U.S. Appl. No. 13/463,801, filed May 3, 2012.

Notice of Allowance dated Mar. 14, 2013, U.S. Appl. No. 13/463,801, filed May 3, 2012.

FAIPP Pre-Interview Communication dated Jul. 25, 2013, U.S. Appl. No. 13/470,203, filed May 11, 2012.

FAIPP Pre-Interview Communication dated Jun. 6, 2013, U.S. Appl. No. 13/571,348, filed Aug. 10, 2012.

First Action Interview Pre-Interview Communication dated Dec. 27, 2011, U.S. Appl. No. 12/486,873, filed Jun. 18, 2009.

First Action Interview Office Action dated Feb. 13, 2012, U.S. Appl. No. 12/486,873, filed Jun. 18, 2009.

Office Action dated Jul. 5, 2012, U.S. Appl. No. 12/486,873, filed Jun. 18, 2009.

Final Office Action dated Feb. 1, 2013, U.S. Appl. No. 12/486,873, filed Jun. 18, 2009.

Cope, Warren B., et al., "Electronic Purchase Transaction Trust Infrastructure", filed May 29, 2012, U.S. Appl. No. 13/482,731.

Cope, Warren B., et al., "Alternative hardware and Software Configuration for Near Field Communication", filed May 4, 2012, U.S. Appl. No. 13/463,797.

Cope, Warren B., et al., "Multiple Secure Elements in Mobile Electronic Device with Near Field Communication Capability", filed Apr. 5, 2012, U.S. Appl. No. 13/440,980.

Bye, Stephen James, et al., "Near Field Communication Authentication and Validation to Access Corporate Data", filed May 3, 2012, U.S. Appl. No. 13/463,801.

Katzer, Robin D., et al., "Web Server Bypass of Backend Process on Near Field Communications and Secure Elements Chips", filed May 11, 2012, U.S. Appl. No. 13/470,203.

Katzer, Robin D., et al., "Web Server Bypass of Backend Process on Near Field Communications and Secure Elements Chips", filed May 10, 2013, PCT Application No. PCT/US13/40673.

Katzer, Robin D., et al., "Secure Placement of Centralized Media Controller Application in Mobile Access Terminal", filed Nov. 11, 2011, U.S. Appl. No. 13/294,177.

McRoberts, Leo Michael, et al., "End-to-End Trusted Communications Infrastructure", filed Jun. 25, 2012, U.S. Appl. No. 13/532,588.

McRoberts, Leo Michael, et al., "End-to-End Trusted Communications Infrastructure", filed on Jun. 25, 2013, PCT Serial No. PCT/US13/47729.

Paczkowski, Lyle W., et al., "Trusted Policy and Charging Enforcement Function", filed Jun. 27, 2012, U.S. Appl. No. 13/533,969.

Bye, Stephen James, et al., "Systems and Methods for Provisioning and Using Multiple Trusted Security Zones on an Electronic Device", filed Aug. 10, 2012, U.S. Appl. No. 13/571,348.

Bye, Stephen James, et al., "Systems and Methods for Provisioning and Using Multiple Trusted Security Zones on an Electronic Device", filed on Aug. 5, 2013, PCT Serial No. PCT/US13/53617.

Bye, Stephen James, et al., "Trusted Signaling in Long Term Evolution (LTE) 4G Wireless Communication", filed Feb. 7, 2013, U.S. Appl. No. 13/762,319.

Cope, Warren B., et al., "Extended Trusted Security Zone Radio Modem", filed Jul. 2, 2012, U.S. Appl. No. 13/540,437.

Katzer, Robin D., et al., "Trusted Access to Third Party Applications Systems and Methods", filed Jul. 25, 2012, U.S. Appl. No. 13/557,213.

Paczkowski, Lyle W., et al., "System and Methods for Trusted Internet Domain Networking", filed Sep. 11, 2012, U.S. Appl. No. 13/610,856.

Paczkowski, Lyle W., et al., "Trusted Security Zone Access to Peripheral Devices", filed Jul. 24, 2013, PCT Application No. PCT/US13/51750.

Paczkowski, Lyle W., et al., Enablement of a Trusted Security Zone Authentication for Remote Mobile Device Management Systems and Methods, filed Mar. 15, 2013, U.S. Appl. No. 13/844,357.

Paczkowski, Lyle W., et al., "Trusted Security Zone Communication Addressing on an Electronic Device", filed Mar. 15, 2013, U.S. Appl. No. 13/844,145.

Bye, Stephen James, et al., "Protection for Multimedia Files Pre-Downloaded to a Mobile Device", filed Apr. 15, 2013, U.S. Appl. No. 13/863,376.

Paczkowski, Lyle W., et al., "Point-of-Sale and Automated Teller Machine Transactions Using Trusted Mobile Access Device", filed Mar. 13, 2013, U.S. Appl. No. 13/802,383.

(56) References Cited

OTHER PUBLICATIONS

Paczkowski, Lyle W., et al., "Trusted Security Zone Re-Provisioning and Re-Use Capability for Refurbished Mobile Devices", filed Mar. 14, 2013, U.S. Appl. No. 13/831,486.

Paczkowski, Lyle W., et al., "Trusted Security Zone Enhanced with Trusted Hardware Drivers", filed Mar. 13, 2013, U.S. Appl. No. 13/802,404.

Paczkowski, Lyle W., et al., "Restricting Access of a Portable Communication Device to Confidential Data or Applications via a Remote Network Based on Event Triggers Generated by the Portable Communication Device", filed Mar. 15, 2013, U.S. Appl. No. 13/844,282.

Paczkowski, Lyle W., et al., "JTAG Fuse Vulnerability Determination and Protection Using a Trusted Execution Environment", filed Mar. 15, 2013, U.S. Appl. No. 13/844,325.

Paczkowski, Lyle W., et al., "Trusted Security Zone Containers for the Protection and Confidentiality of Trusted Service Manager Data", filed Mar. 14, 2013, U.S. Appl. No. 13/831,463.

Bye, Stephen James, et al., "Delivering Digital Content to a Mobile Device via a Digital Rights Clearing House", filed Apr. 10, 2013, U.S. Appl. No. 13/860,338.

Paczkowski, Lyle W., et al., "Method for Enabling Hardware Assisted Operating System Region for Safe Execution of Untrusted Code Using Trusted Transitional Memory", filed May 20, 2013, U.S. Appl. No. 13/898,435.

Paczkowski, Lyle W., et al., "Verifying Applications Using a Trusted Security Zone", filed Aug. 12, 2013, U.S. Appl. No. 13/964,112.

Paczkowski, Lyle W., et al., "Mobile Access Terminal with Local Call Session Control Function", filed Jun. 18, 2009, U.S. Appl. No. 12/486,873.

Zimmerman, Ann, "Check Out the Future of Shopping", The Wall Street Journal, Business, May 18, 2011, http://online.wsj,com/article/SB10001424052748703421204576329253050634700.html.

Garry, Michael, Kroger Test Prepares for Mobile Future:, SN, Supermarket News, Jun. 13, 2011, http://supermarketnews.com/technology/kroger-test-prepares-mobile-future.

Jones, Sally, "Industry Trends in POS Hardware for Mobile Devices", Aug. 31, 2011, http://pointofsale.com/20110831734/Mobile-POS-News/industry-trends-in-pos-hardware-for-mobile-devices.html.

Final Office Action dated Sep. 9, 2013, U.S. Appl. No. 13/440,980, filed Apr. 5, 2012.

Office Action dated Sep. 25, 2013, U.S. Appl. No. 13/571,348, filed Aug. 10, 2012.

Notice of Allowance dated Aug. 30, 2013; U.S. Appl. No. 13/540,437, filed Jul. 2, 2012.

Restriction Requirement dated Nov. 1, 2013, U.S. Appl. No. 13/557,213, filed Jul. 25, 2012.

\* cited by examiner

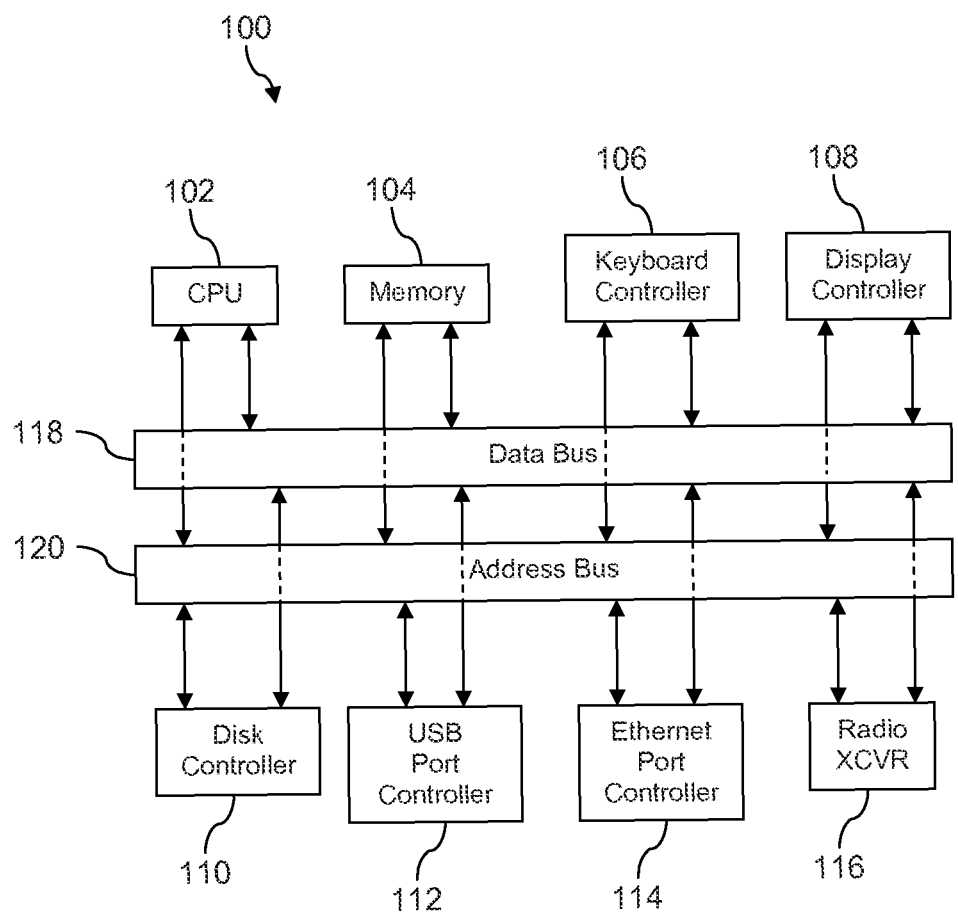
FIG. 1
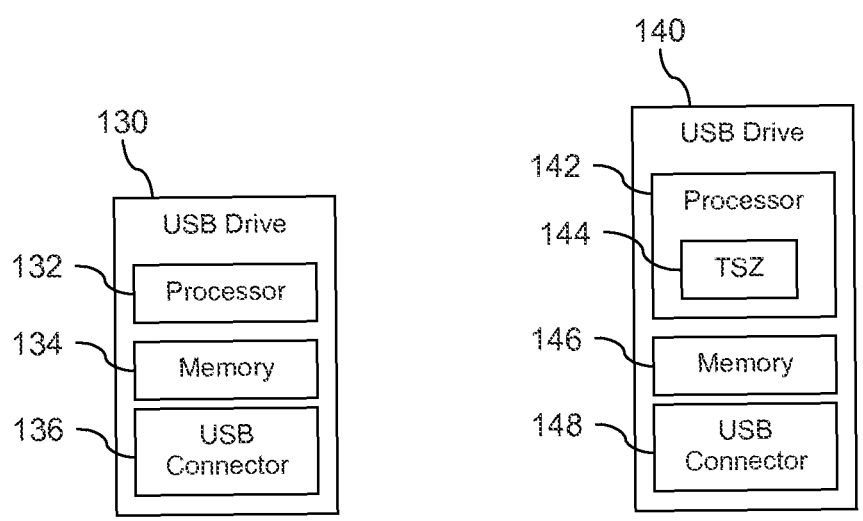
FIG. 2A
FIG. 2B

TRUSTED SECURITY ZONE ACCESS TO PERIPHERAL DEVICES

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Computing platforms abound in daily life. We use sophisticated logic processors that execute complicated software and/or firmware to perform a wide variety of activities. Increasingly, confidential information is being stored, manipulated, and/or communicated by these computing platforms. Examples of such confidential information comprises social security numbers, credit card numbers, authentication numbers, financial accounts, education related passwords, medical records, medical diagnostic information, contact information, confidential documents, and other sensitive information. Because more and more sensitive information is present in these computing platforms, the rewards for hacking the security of these computing platforms to access the information are increasing.

SUMMARY

In an embodiment, a method of trusted data communication is disclosed. The method comprises executing a data communication application in a trusted security zone of a processor, wherein the processor is a component of a computer and commanding a controller of a first peripheral device to execute a control application in a trusted security zone of the controller, wherein the controller of the first peripheral device is a component of the computer. The method further comprises commanding at least one of another peripheral device or a user interface device to not access a data bus of the computer and verifying that the controller of the first peripheral device is executing the control application in the trusted security zone of the controller. The method further comprises, after verifying that the controller of the first peripheral device is executing the control application in the trusted security zone of the controller, sending data from the processor to the controller of the first peripheral device over the data bus of the computer, and the controller of the first peripheral device one of transmitting the data sent by the processor on an external communication link, reading a memory storage disk, or writing to a memory storage disk.

In an embodiment, a universal serial bus (USB) drive is disclosed. The universal serial bus drive comprises a memory, wherein the memory contains at least some confidential information, a processor coupled to the memory, a universal serial bus connector coupled to the processor, and an application stored in the memory. When executed by the processor, the application determines that a request to access the memory received by the universal serial bus connector is directed to the confidential information, and, when a message is received by the connector from the sender of the request to access memory that indicates that the sender is executing in a trusted security zone, satisfies the request to access the memory. When no message is received by the connector from the sender of the request to access memory that indicates that the sender is executing in a trusted security zone, the application does not satisfy the request to access the memory.

In an embodiment, a method of accessing a memory disk drive is disclosed. The method comprises transmitting to a disk controller of a memory disk drive a command to execute in a trusted security zone of the disk controller, transmitting to the disk controller a request for confirmation that the disk controller is executing in the trusted security zone of the disk controller, and when a confirmation that the disk controller is executing in the trusted security zone of the disk controller is received, transmitting to the disk controller a command to access a trusted security zone portion of the memory disk drive.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

FIG. 1 is an illustration of a system according to an embodiment of the disclosure.

FIG. 2A is an illustration of a universal serial bus (USB) drive according to an embodiment of the disclosure.

FIG. 2B is an illustration of another universal serial bus drive according to an embodiment of the disclosure.

DETAILED DESCRIPTION

Figure 3:
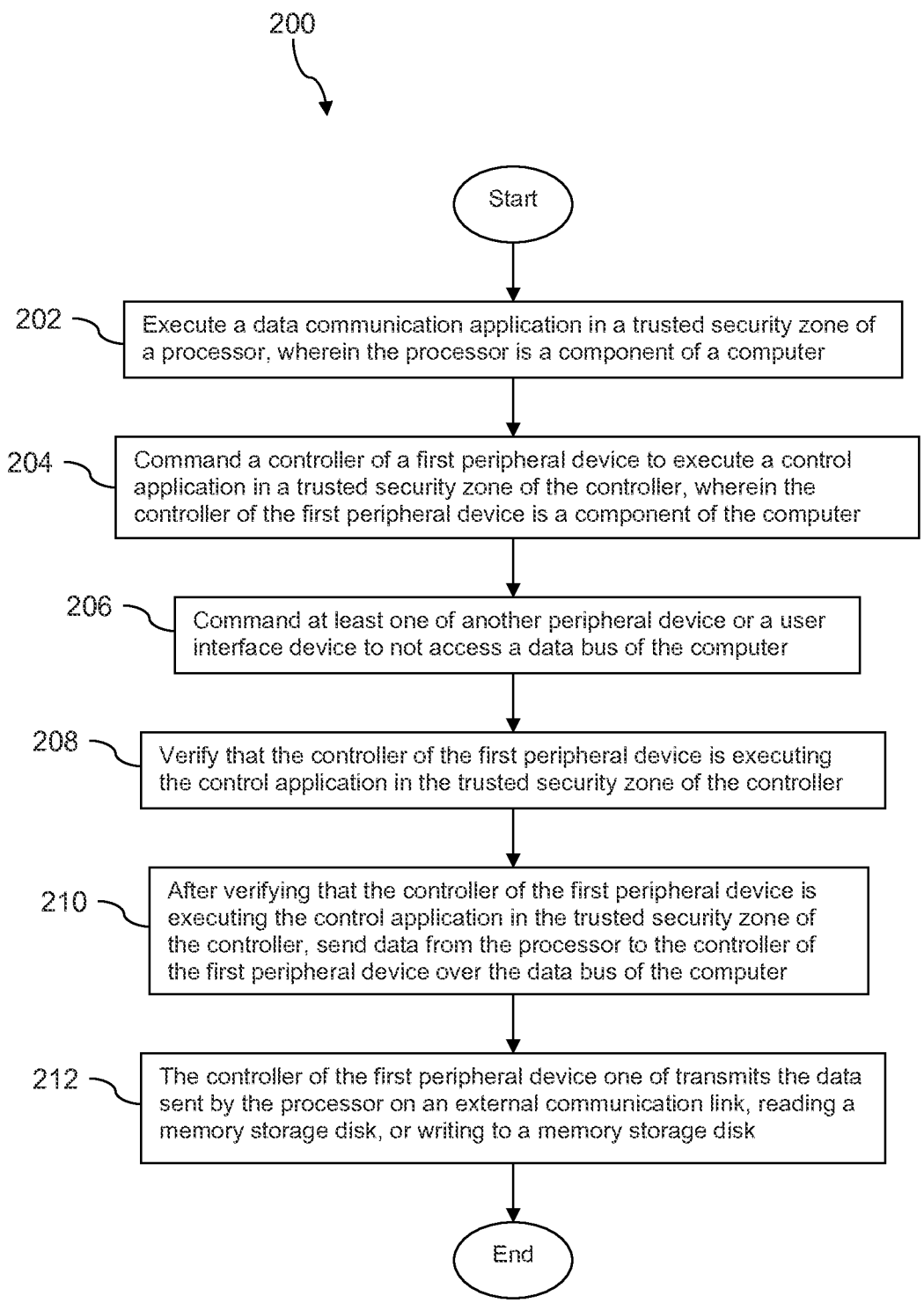
FIG. 3 is a flow chart of a method according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

In an embodiment, systems and methods for trusted communication with peripheral devices and/or peripheral controllers is disclosed. In a typical computer system, logic executes not only on a central processor but in peripheral devices such as a port controller, a disk controller, a radio transceiver, and other devices. The peripheral devices may comprise microprocessors, digital signal processors (DSPs), application specific integrated circuits (ASICs), field programmable logic arrays (FPGAs), complex programmable logic devices (CPLDs), or other logic processors. As such, malware that may have been infiltrated into the executable logic of these peripheral devices may be able to monitor or sniff confidential information as it passes on a data bus of the computer system, though the subject peripheral device may not have been addressed and/or commanded to read the subject confidential information. Malware in a peripheral device may be able to access confidential information stored in a memory of the computer system. Confidential information may comprise credit card account numbers, credit card authentication numbers, personal data, medical data, and other information.

The present disclosure teaches transferring confidential information between two trusted logic processors, thereby providing a continuity of trust, while at the same time capturing or locking out other peripheral devices and thereby preventing them from potentially monitoring or sniffing the confidential information as it is transmitted on the data bus. This state of the computer system may be referred to as a trusted mode of operation. In an embodiment, a logic processor of a peripheral device that is not a party to the trusted communication is commanded to execute in a trusted security zone of the logic processor of the peripheral device, and while executing in its trusted security zone the logic processor of the peripheral executes a trusted routine or program that performs no substantive processing and does not read the data bus. The logic processors that are engaged in transmitting the confidential information may both execute trusted communication applications or programs in a trusted security zone of each of the logic processors. When executing in the trusted security zone, each of these logic processors pause or idle any other normal applications or programs that were active. When the confidential information has been transported over the data bus, the logic processor of the peripheral device and the other communication party may be commanded to execute in a normal security zone of the logic processor, thereby resuming normal processing. The logic processors of the other peripheral controllers and/or device controllers may likewise be commanded to resume executing in the normal security zone.

A universal serial bus (USB) drive may be plugged into a USB port of the computer system, and a central processing unit of the computer system may attempt to read confidential information from the USB drive. The USB drive may execute logic in a processor that delays providing access to the confidential information to the central processing unit until the central processing unit sends a trust token to the USB drive that confirms that the central processing unit is executing in a trusted security zone. The processor in the USB drive may execute in a trusted security zone or may execute in a normal security zone, for example when the processor of the USB does not comprise a trusted security zone.

A disk drive controller may mediate access to a disk drive. The disk drive may have a normal memory area and a trusted memory area. The disk drive controller may have a trusted security zone, and the trusted memory area may be known only to the trusted security zone or may be accessible only from the trusted security zone. In an embodiment, disk memory may be flagged as trusted memory space, and the disk drive controller may begin executing in the trusted security zone when memory that is flagged as trusted is accessed.

A trusted security zone provides chipsets with a hardware root of trust, a secure execution environment for applications, and secure access to peripherals. A hardware root of trust means the chipset should only execute programs intended by the device manufacturer or vendor and resists software and physical attacks, and therefore remains trusted to provide the intended level of security. The chipset architecture is designed to promote a programmable environment that allows the confidentiality and integrity of assets to be protected from specific attacks. Trusted security zone capabilities are becoming features in both wireless and fixed hardware architecture designs. Providing the trusted security zone in the main mobile device chipset and protecting the hardware root of trust removes the need for separate secure hardware to authenticate the device or user. To ensure the integrity of the applications requiring trusted data, such as a mobile financial services application, the trusted security zone also provides the secure execution environment where only trusted applications can operate, safe from attacks. Security is further promoted by restricting access of non-trusted applications to peripherals, such as data inputs and data outputs, while a trusted application is running in the secure execution environment. In an embodiment, the trusted security zone may be conceptualized as hardware assisted security.

A complete trusted execution environment (TEE) may be implemented through the use of the trusted security zone hardware and software architecture. The trusted execution environment is an execution environment that is parallel to the execution environment of the main mobile device operating system. The trusted execution environment and/or the trusted security zone may provide a base layer of functionality and/or utilities for use of applications that may execute in the trusted security zone. For example, in an embodiment, trust tokens may be generated by the base layer of functionality and/or utilities of the trusted execution environment and/or trusted security zone for use in trusted end-to-end communication links to document a continuity of trust of the communications. For more details on establishing trusted end-to-end communication links relying on hardware assisted security, see U.S. patent application Ser. No. 13/532,588, filed Jun. 25, 2012, entitled "End-to-end Trusted Communications Infrastructure," by Leo Michael McRoberts, et al., which is hereby incorporated by reference in its entirety. Through standardization of application programming interfaces (APIs), the trusted execution environment becomes a place to which scalable deployment of secure services can be targeted. A device which has a chipset that has a trusted execution environment on it may exist in a trusted services environment, where devices in the trusted services environment are trusted and protected against attacks. The trusted execution environment can be implemented on mobile phones and tablets as well as extending to other trusted devices such as personal computers, servers, sensors, medical devices, point-of-sale terminals, industrial automation, handheld terminals, automotive, etc.

The trusted security zone is implemented by partitioning all of the hardware and software resources of the mobile device into two partitions: a secure partition and a normal partition. Placing sensitive resources in the secure partition can protect against possible attacks on those resources. For example, resources such as trusted software applications may run in the secure partition and have access to hardware peripherals such as a touchscreen or a secure location in memory. Less secure peripherals such as wireless radios may be disabled completely while the secure partition is being accessed, while other peripherals may only be accessed from the secure partition. While the secure partition is being accessed through the trusted execution environment, the main mobile operating system in the normal partition is suspended, and applications in the normal partition are prevented from accessing the secure peripherals and data. This prevents corrupted applications or malware applications from breaking the trust of the device.

The trusted security zone is implemented by partitioning the hardware and software resources to exist in a secure subsystem which is not accessible to components outside the secure subsystem. The trusted security zone is built into the processor architecture at the time of manufacture through hardware logic present in the trusted security zone which enables a perimeter boundary between the secure partition and the normal partition. The trusted security zone may only be manipulated by those with the proper credential and, in an embodiment, may not be added to the chip after it is manufactured. Software architecture to support the secure partition may be provided through a dedicated secure kernel running trusted applications. Trusted applications are independent secure applications which can be accessed by normal applications through an application programming interface in the trusted execution environment on a chipset that utilizes the trusted security zone.

In an embodiment, the normal partition applications run on a first virtual processor, and the secure partition applications run on a second virtual processor. Both virtual processors may run on a single physical processor, executing in a time-sliced fashion, removing the need for a dedicated physical security processor. Time-sliced execution comprises switching contexts between the two virtual processors to share processor resources based on tightly controlled mechanisms such as secure software instructions or hardware exceptions. The context of the currently running virtual processor is saved, the context of the virtual processor being switched to is restored, and processing is restarted in the restored virtual processor. Time-sliced execution protects the trusted security zone by stopping the execution of the normal partition while the secure partition is executing.

The two virtual processors context switch via a processor mode called monitor mode when changing the currently running virtual processor. The mechanisms by which the processor can enter monitor mode from the normal partition are tightly controlled. The entry to monitor mode can be triggered by software executing a dedicated instruction, the Secure Monitor Call (SMC) instruction, or by a subset of the hardware exception mechanisms such as hardware interrupts, which can be configured to cause the processor to switch into monitor mode. The software that executes within monitor mode then saves the context of the running virtual processor and switches to the secure virtual processor.

The trusted security zone runs a separate operating system that is not accessible to the device users. For security purposes, the trusted security zone is not open to users for installing applications, which means users do not have access to install applications in the trusted security zone. This prevents corrupted applications or malware applications from executing powerful instructions reserved to the trusted security zone and thus preserves the trust of the device. The security of the system is achieved at least in part by partitioning the hardware and software resources of the mobile phone so they exist in one of two partitions, the secure partition for the security subsystem and the normal partition for everything else. Placing the trusted security zone in the secure partition and restricting access from the normal partition protects against software and basic hardware attacks. Hardware logic ensures that no secure partition resources can be accessed by the normal partition components or applications. A dedicated secure partition operating system runs in a virtual processor separate from the normal partition operating system that likewise executes in its own virtual processor. Users may install applications on the mobile device which may execute in the normal partition operating system described above. The trusted security zone runs a separate operating system for the secure partition that is installed by the mobile device manufacturer or vendor, and users are not able to install new applications in or alter the contents of the trusted security zone.

Turning now to FIG. 1, a system 100 is described. In an embodiment, the system 100 comprises a central processing unit (CPU) 102, a memory 104, a keyboard controller 106, a display controller 108, a disk controller 110, a universal serial bus (USB) port controller 112, an Ethernet port controller 114, and a radio transceiver 116. The system 100 further comprises a data bus 118 and an address bus 120. The system 100 may comprise other components and/or communication pathways not shown. For example, the system 100 may comprise a variety of control lines or a control bus that is not shown. In an embodiment, commands and/or control signals may be carried on the data bus 118.

In an embodiment, the system 100 implements a computer system, for example a desktop computer, a laptop computer, a notebook computer, a server computer, a database server computer, or other computer. Some aspects of computer systems are described towards the end of this specification. While not inconsistent with the description of computer systems at the end of the specification, the depiction of the system 100 in FIG. 1 is convenient for discussing some aspects of the embodiments of the disclosure. The system 100 may also be embodied as a mobile device such as a mobile phone, a personal digital assistant (PDA), a media player, and other portable devices that have a radio frequency communication capability. In an embodiment, the system 100 may not comprise the disk controller 110 or the Ethernet port controller 114.

The memory 104 may be any of a variety of semi-conductor memory such as read only memory (ROM), random access memory (RAM), flash memory, static random access memory (SRAM), dynamic random access memory (DRAM), and the like. The system 100 may also access disk memory (not shown) via the disk controller 110. In an embodiment, access to the memory 104 may be mediated by a memory controller (not shown). The memory controller may execute software and/or firmware instructions in a logic processor. Alternatively, in another embodiment, the memory 104 may be accessed from the address bus 120 and the data bus 118 without mediation provided by a memory controller.

The keyboard controller 106 may receive input from a traditional keyboard or from a touch input device, such as a touch screen device. The keyboard controller 106, or another controller, may also receive input from a microphone. The keyboard controller 106 may de-bounce the keys of the keyboard, buffer user input when the buses 118, 120 are busy, send the input from the keyboard on the data bus 118 to the CPU 102, and provide other mediating services. The display controller 108 may receive output from the CPU 102 and send the output to a visual display in such a way as to present the output on the visual display. The disk controller 110 may mediate requests to read from and to write to a disk drive (not shown). The USB port controller 112 may mediate requests to read from and to write to a USB drive. The Ethernet port controller 114 may mediate requests to read from and to write to an Ethernet communication link. The radio transceiver 116 may comprise a logic processor that modulates and demodulates signals. The radio transceiver 116 may further comprise radio components for upconverting a modulated signal to a radio frequency signal, amplifying the radio frequency signal, and transmitting the radio frequency signal via an antenna (not shown) as well as for receiving a radio frequency signal via the antenna, amplifying the received radio frequency signal, and downconverting the radio frequency signal to a baseband signal. As is known to one skilled in the art, the radio transceiver 116 may provide a variety of further signal processing functions. In an embodiment, each of the controllers 106, 108, 110, 112, 114 and the radio transceiver 116 may execute software and/or firmware instructions in a logic processor such as a microprocessor, a digital signal processor, an application specific integrated circuit, a field programmable logic array, a complex programmable logic device, or other logic processors.

The CPU 102 may be considered to manage or control the memory 104, the controllers 106, 108, 110, 112, 114, and the radio transceiver 116 by sending control signals. The CPU 102 may be implemented as a logic processor, for example a microprocessor, a digital signal processor, and/or another logic processor. The CPU 102 executes one or more software or firmware applications to provide the desired functionality of the system 100. The CPU 102 may select devices by addressing them on the address bus 120. The CPU 102 may read from or write to devices on the data bus 118. Some of the data transmitted or received may comprise confidential information that is desired to be processed using a continuity of trust. A continuity of trust may be considered to be provided when the CPU 102 executes in a trusted security zone and writes to or reads from a peripheral device that likewise executes in a trusted security zone of the device, for example, in a trusted security zone of one of the controllers 106, 108, 110, 112, 114 or of the radio transceiver 116.

As an example, the CPU 102 may execute a disk drive reading routine in a trusted security zone of the CPU 102, may command the controllers 106, 108, 112, 114 and the radio transceiver 116 to execute in a trusted security zone of their respective logic processors and to execute an idling program, and may command the disk controller 110 to execute a disk access routine in a trusted security zone of the logic processor of the disk controller 110. While the controllers 106, 108, 112, 114 and the radio transceiver 116 execute the idling program, they do not read from or write to the data bus 118. Additionally, in an embodiment, untrusted applications are not allowed to execute on the controllers 106, 108, 110, 112, 114 or on the radio transceiver 116 while they are executing in the trusted security zone. Under this condition, which may be referred to as a trusted mode of operation, the CPU 102 may send a request to read the data from a specific address or range of addresses of the disk drive.

The disk controller 110 may receive the request from the CPU 102 and verify that the CPU 102 is executing in the trusted security zone, as indicated by a trust token sent by the CPU 102 to the disk controller 110. The disk controller 110 may then retrieve the requested data while executing a trusted routine in its trusted security zone and transmit this requested data over the data bus 118. After the data has been transmitted, the trusted security mode of operation may be terminated, and the CPU 102, the controllers 106, 108, 110, 112, 114 and the radio transceiver 116 may return to executing in the normal security zone of their respective logic processors.

In an embodiment, data stored on the disk coupled to the disk controller 110 may comprise a trusted/untrusted flag to designate the trust status of the subject unit of data. When the CPU 102 requests to access the data, the disk controller 110 may first read the trust flag, it may identify that the addressed data is trusted data. The disk controller 110 may then execute in its trusted security zone and may send a message to the CPU 102 asking that it enter the trusted security zone to complete disk access.

Turning now to FIG. 2A, a first universal serial bus (USB) drive 130 is described. In an embodiment, the first USB drive 130 comprises a processor 132, a memory 134, and a universal serial bus connector 136. In some contexts, the first USB drive 130 may be referred to as a thumb drive. The first USB drive 130 may be easily portable and inexpensive. The memory 134 may comprise any kind of readable and writeable random access memory.

In an embodiment, the first USB drive 130 may be connected to the system 100 and/or the USB port controller 112 by the USB connector 136. The first USB drive 130 may store confidential information that it is desired to be read from or written to the memory 134, for example by the CPU 102. The processor 132 may determine that the CPU 102 is attempting to write confidential information to or to read confidential information from the memory 134. In this case, the processor 132 may delay performing the requested access to the memory 134 until the CPU 102 sends a trust token indicating that the system 100 has entered the trusted operation mode. In an embodiment, the processor 132 may send a message to the CPU 102 requesting that the system 100 enter the trusted operation mode. When the processor 132 determines the CPU 102 is attempting to write to or read from an area of the memory 134 that does not contain confidential information, the processor 132 may satisfy the memory access request without expecting the system 100 to enter a trusted operation mode. The confidential information may comprise a credit card account number, a credit card authentication number, a financial account number, a financial account authentication number, a social security number, a telephone number, personal data, medical data, or other information.

Turning now to FIG. 2B, a second USB drive 140 is described. In an embodiment, the second USB drive 140 comprises a processor 142 having a trusted security zone 144, the memory 146, and a universal serial bus connector 148. The second USB drive 140 is substantially similar to the first USB drive 130, with the difference that the processor 142 further comprises the trusted security zone 144. In an embodiment, when the second USB drive 140 detects that the system 100 is attempting to access the confidential information stored in the memory 146, the processor 142 begins executing the trusted security zone 144. The trusted security zone 144 may wait for the system 100 to send an indication via the USB port controller 112 that the system 100 is in the trusted operation mode and or send a message to the USB port controller 112 to request the system 100 to go into the trusted operation mode before handing requests to access the confidential information in the memory 146.

Turning now to FIG. 3, a method 200 is described. At block 202, a data communication application is executed in a trusted security zone of a processor, wherein the processor is a component of a computer. At block 204, a controller of a first peripheral device is commanded to execute a control application in a trusted security zone of the controller, wherein the controller of the first peripheral device is a component of the computer. This block may comprise sending a trusted flag or other indication that the trusted mode of operation should be entered, by the processor to the controller. Of the first peripheral device. At block 206, at least one of another peripheral device or a user interface device is commanded to not access a data bus of the computer. At block 208, it is verified that the controller of the first peripheral device is executing the control application in the trusted security zone of the controller.

At block 210, after verifying that the controller of the first peripheral device is executing the control application in the trusted security zone of the controller, data is sent from the processor to the controller of the first peripheral device over the data bus of the computer. At block 212, the controller of the first peripheral device one of transmits the data sent by the processor on an external communication link, reading a memory storage disk, or writing to a memory storage disk.

Figure 4:
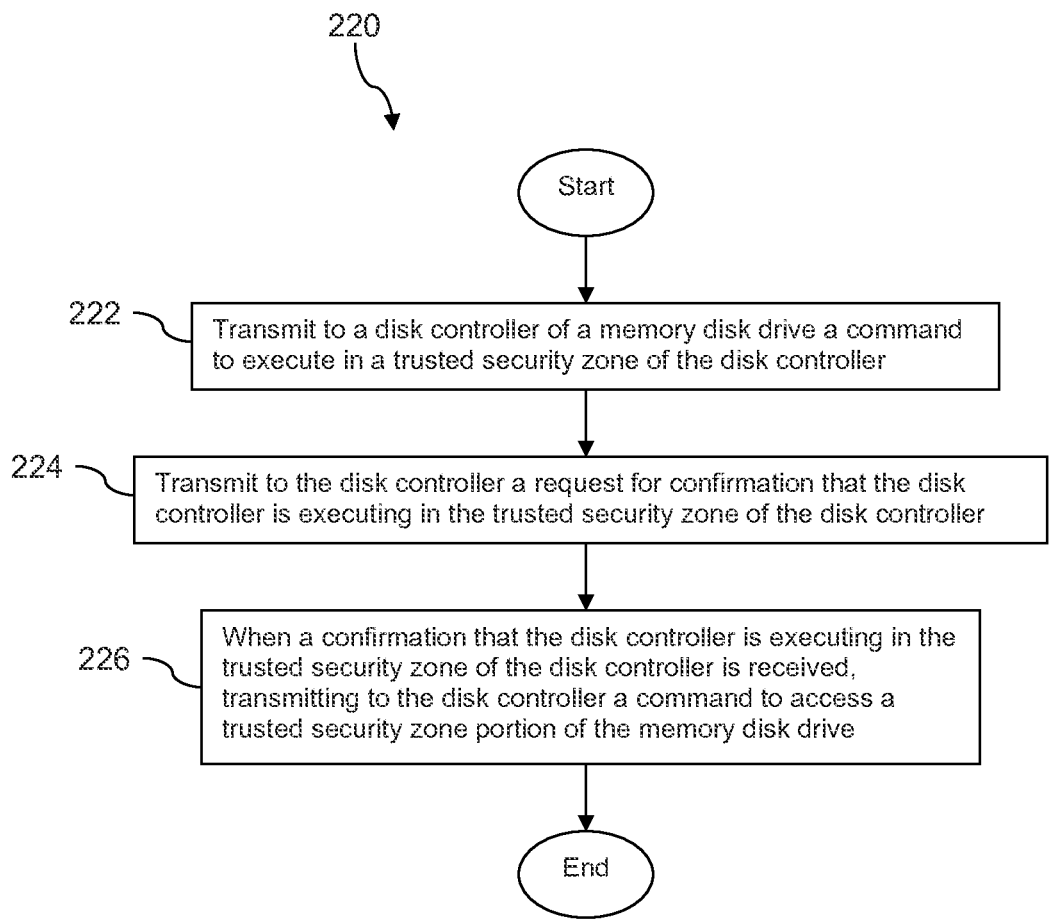
FIG. 4 is a flow chart of another method according to an embodiment of the disclosure.

Turning now to FIG. 4, a method 220 is described. At block 222, a command to execute in a trusted security zone of a disk controller is transmitted to the disk controller. At block 224, a request for confirmation that the disk controller is executing in the trusted security zone of the disk controller is transmitted to the disk controller. At block 226, when a confirmation that the disk controller is executing in the trusted security zone of the disk controller is received, transmit to the disk controller a command to access a trusted security zone portion of the memory disk drive.

Figure 5:
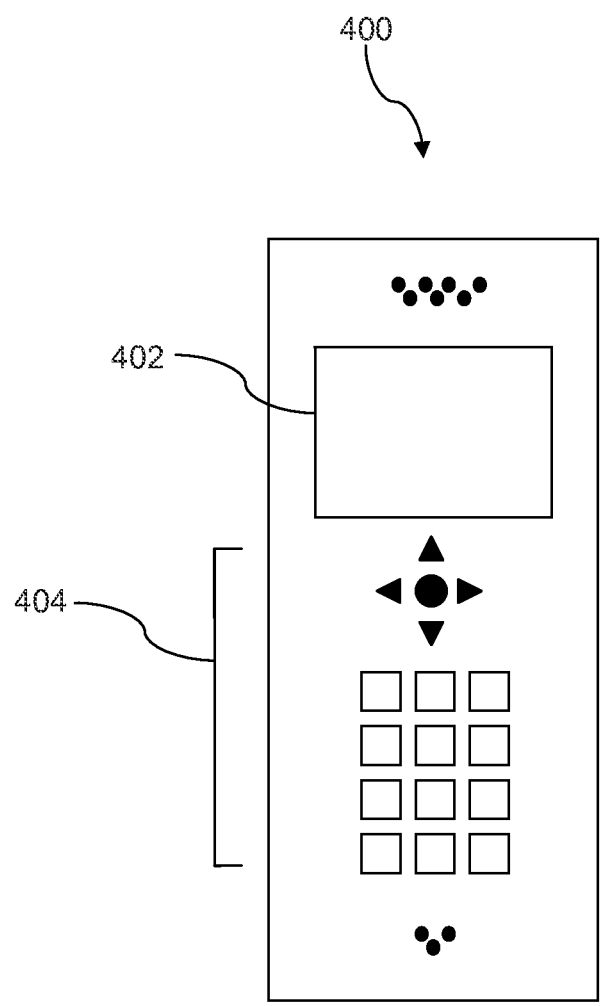
FIG. 5 is an illustration of a mobile phone according to an embodiment of the disclosure.

FIG. 5 depicts a mobile device 400, which is operable for implementing aspects of the present disclosure, but the present disclosure should not be limited to these implementations. Though illustrated as a mobile phone, the mobile device 400 may take various forms including a wireless handset, a pager, a personal digital assistant (PDA), a gaming device, or a media player. The mobile device 400 includes a display 402 and a touch-sensitive surface and/or keys 404 for input by a user. The mobile device 400 may present options for the user to select, controls for the user to actuate, and/or cursors or other indicators for the user to direct. The mobile device 400 may further accept data entry from the user, including numbers to dial or various parameter values for configuring the operation of the handset. The mobile device 400 may further execute one or more software or firmware applications in response to user commands. These applications may configure the mobile device 400 to perform various customized functions in response to user interaction. Additionally, the mobile device 400 may be programmed and/or configured over-the-air, for example from a wireless base station, a wireless access point, or a peer mobile device 400. The mobile device 400 may execute a web browser application which enables the display 402 to show a web page. The web page may be obtained via wireless communications with a base transceiver station, a wireless network access node, a peer mobile device 400 or any other wireless communication network or system.

Figure 6:
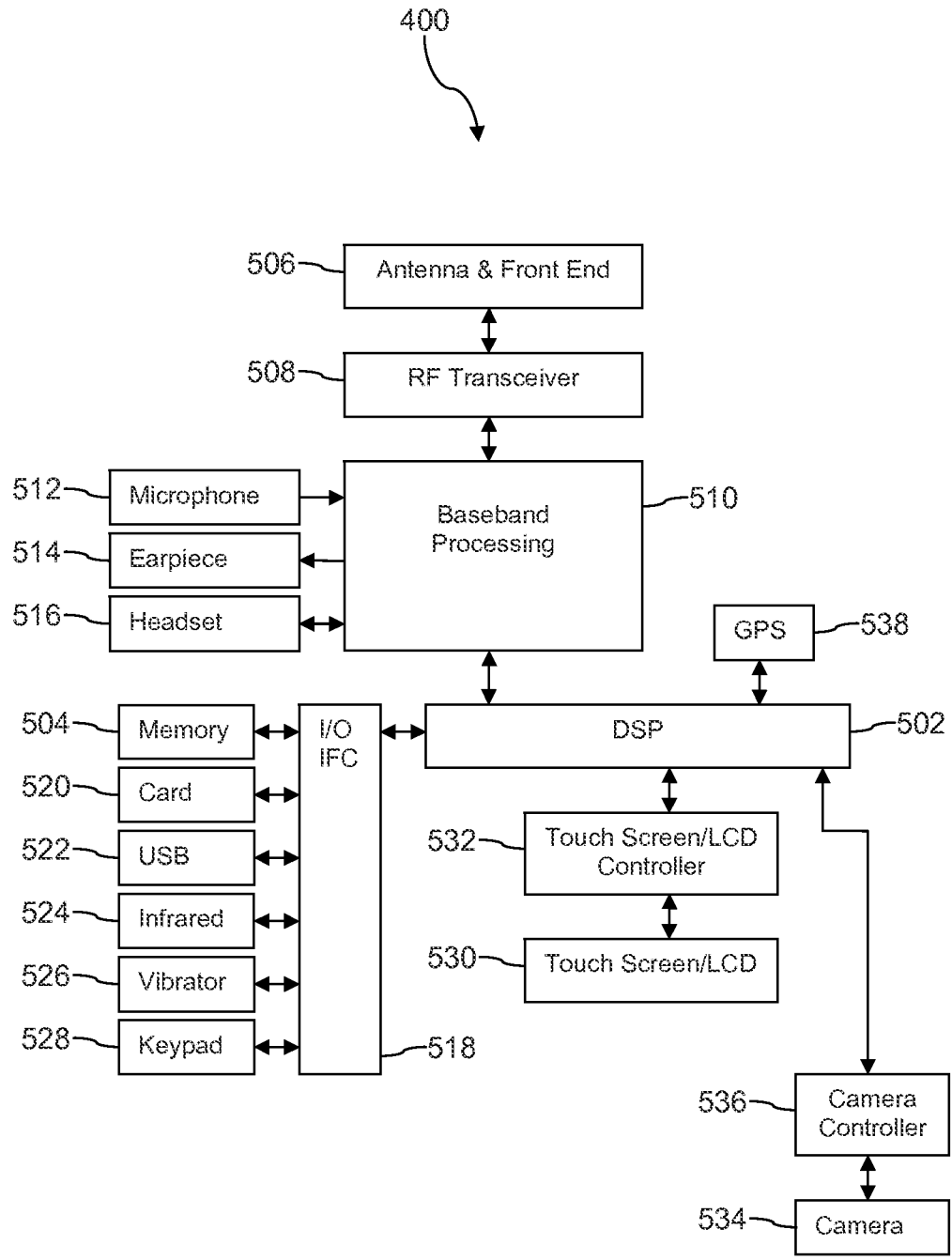
FIG. 6 is a block diagram of a mobile phone according to an embodiment of the disclosure.

FIG. 6 shows a block diagram of the mobile device 400. While a variety of known components of handsets are depicted, in an embodiment a subset of the listed components and/or additional components not listed may be included in the mobile device 400. The mobile device 400 includes a digital signal processor (DSP) 502 and a memory 504. As shown, the mobile device 400 may further include an antenna and front end unit 506, a radio frequency (RF) transceiver 508, a baseband processing unit 510, a microphone 512, an earpiece speaker 514, a headset port 516, an input/output interface 518, a removable memory card 520, a universal serial bus (USB) port 522, an infrared port 524, a vibrator 526, a keypad 528, a touch screen liquid crystal display (LCD) with a touch sensitive surface 530, a touch screen/LCD controller 532, a camera 534, a camera controller 536, and a global positioning system (GPS) receiver 538. In an embodiment, the mobile device 400 may include another kind of display that does not provide a touch sensitive screen. In an embodiment, the DSP 502 may communicate directly with the memory 504 without passing through the input/output interface 518. Additionally, in an embodiment, the mobile device 400 may comprise other peripheral devices that provide other functionality.

The DSP 502 or some other form of controller or central processing unit operates to control the various components of the mobile device 400 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the mobile device 400 to function as a peripheral device to exchange information with a personal computer or other computer system. The infrared port 524 and other optional ports such as a Bluetooth interface or an IEEE 802.11 compliant wireless interface may enable the mobile device 400 to communicate wirelessly with other nearby handsets and/or wireless base stations.

The keypad 528 couples to the DSP 502 via the interface 518 to provide one mechanism for the user to make selections, enter information, and otherwise provide input to the mobile device 400. Another input mechanism may be the touch screen LCD 530, which may also display text and/or graphics to the user. The touch screen LCD controller 532 couples the DSP 502 to the touch screen LCD 530. The GPS receiver 538 is coupled to the DSP 502 to decode global positioning system signals, thereby enabling the mobile device 400 to determine its position.

Figure 7A:
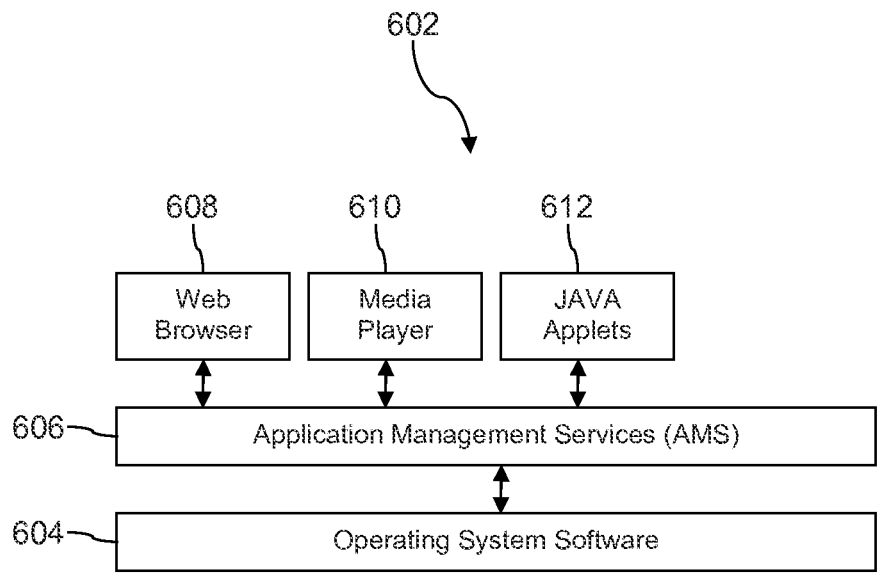
FIG. 7A is an illustration of a software architecture of a mobile phone according to an embodiment of the disclosure.

FIG. 7A illustrates a software environment 602 that may be implemented by the DSP 502. The DSP 502 executes operating system software 604 that provides a platform from which the rest of the software operates. The operating system software 604 may provide a variety of drivers for the handset hardware with standardized interfaces that are accessible to application software. The operating system software 604 may be coupled to and interact with application management services (AMS) 606 that transfer control between applications running on the mobile device 400. Also shown in FIG. 7A are a web browser application 608, a media player application 610, and JAVA applets 612. The web browser application 608 may be executed by the mobile device 400 to browse content and/or the Internet, for example when the mobile device 400 is coupled to a network via a wireless link. The web browser application 608 may permit a user to enter information into forms and select links to retrieve and view web pages. The media player application 610 may be executed by the mobile device 400 to play audio or audiovisual media. The JAVA applets 612 may be executed by the mobile device 400 to provide a variety of functionality including games, utilities, and other functionality.

Figure 7B:
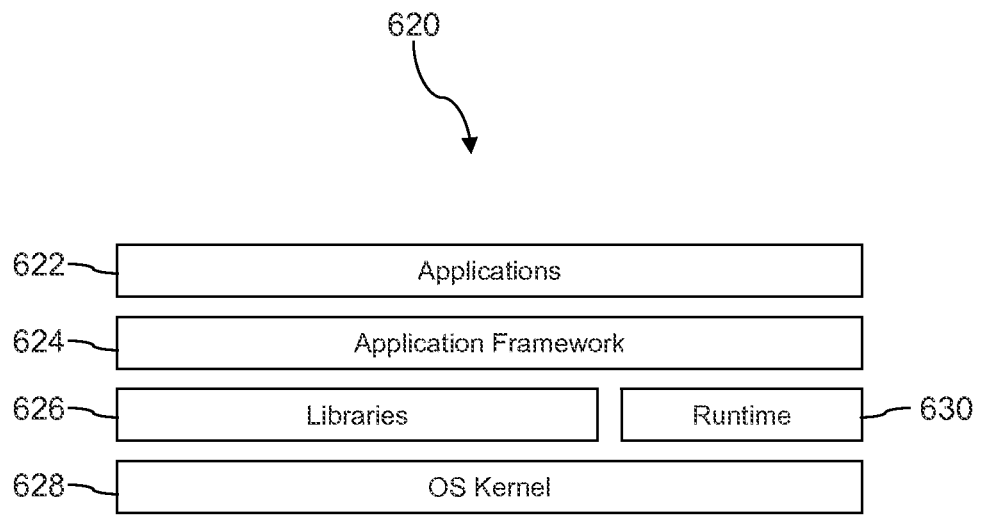
FIG. 7B is an illustration of another software architecture of a mobile phone according to an embodiment of the disclosure.

FIG. 7B illustrates an alternative software environment 620 that may be implemented by the DSP 502. The DSP 502 executes operating system software 628 and an execution runtime 630. The DSP 502 executes applications 622 that may execute in the execution runtime 630 and may rely upon services provided by the application framework 624. Applications 622 and the application framework 624 may rely upon functionality provided via the libraries 626.

Figure 8:
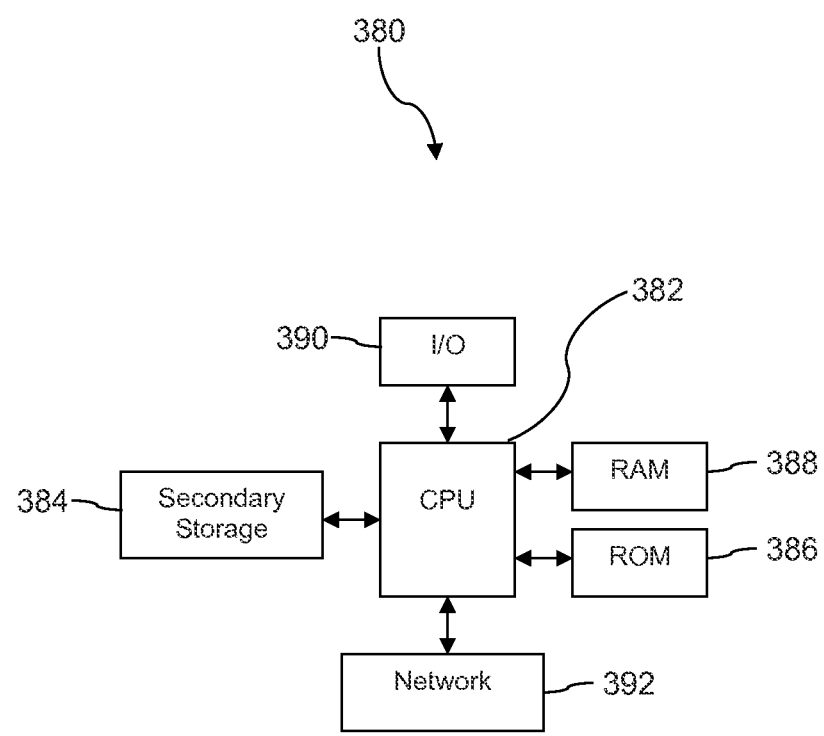
FIG. 8 is an illustration of a computer system according to an embodiment of the disclosure.

FIG. 8 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method of trusted data communication, comprising:
   executing, by a computer, a data communication application in a trusted security zone of a processor, wherein the processor is a component of the computer;
   commanding, by the computer, a controller of a trusted peripheral device to execute a control application in a trusted security zone of the controller, wherein the controller of the trusted peripheral device is a component of the computer, and wherein the trusted peripheral device is a party to a trusted data communication;
   commanding, by the computer, at least one of another peripheral device or a user interface device to not access a data bus of the computer and to execute an idling program to idle active applications or programs while the controller of the trusted peripheral device is executing the control application in the trusted security zone of the controller, wherein the at least one of the other peripheral device or the user interface does not read from or write to the data bus while executing the idling program, and wherein the at least one of the other peripheral device or the user interface device is not a party to the trusted data communication;
   verifying, by the computer, that the controller of the trusted peripheral device is executing the control application in the trusted security zone of the controller; and
   sending, by the computer, data from the processor to the controller of the trusted peripheral device over the data bus of the computer after verifying that the controller of the trusted peripheral device is executing the control application in the trusted security zone of the controller;
   wherein the controller of the trusted peripheral device performs at least one of transmitting the data sent by the processor on an external communication link, reading a memory storage disk, or writing to a memory storage disk.

2. The method of claim 1, wherein the trusted peripheral device is a universal serial bus (USB) port.

3. The method of claim 1, wherein the trusted peripheral device is an Ethernet port.

4. The method of claim 1, wherein the trusted peripheral device is a memory disk drive controller.

5. The method of claim 1, wherein the user interface device is one of a keyboard, a display, a touchscreen, or a microphone.

6. The method of claim 1, wherein commanding the controller of the trusted peripheral device to execute the control application in the trusted security zone of the controller is performed by sending a trusted flag in a message by the processor to the controller of the trusted peripheral device.

7. A system for trusted communication, comprising:
   a universal serial bus drive coupled to a data bus, the universal serial bus drive comprising:
      a memory, wherein the memory contains at least some confidential information,
      a processor coupled to the memory, a universal serial bus connector coupled to the processor, and an application stored in the memory that, when executed by the processor, determines that a request to access the memory received by the universal serial bus connector is directed to the at least some confidential information, satisfies the request to access the memory when a message, received by the universal serial bus connector from a sender of the request to access the memory, indicates that the sender is executing in a trusted security zone, and does not satisfy the request to access the memory when the message is not received by the universal series bus connector from the sender; and at least one of a peripheral device or a user interface device coupled to the data bus, wherein the at least one of the peripheral device or the user interface device is commanded to not access the data bus and to execute an idling program to idle active applications or programs while the application satisfies the request to access the memory, wherein the at least one of the peripheral device or the user interface does not read from or write to the data bus while executing the idling program, and wherein the at least one of the peripheral device or the user interface device is not a party to a trusted data communication.

8. The system of claim 7, wherein the at least some confidential information comprises at least one of a credit card number, a credit card authentication number, a financial account number, a financial account authentication number, a social security number, or a telephone number.

9. The system of claim 7, wherein the processor comprises a trusted security zone and wherein the application executes in the trusted security zone of the processor.

10. The system of claim 9, wherein the at least some confidential information is stored in a trusted security zone of the memory.

11. The system of claim 9, wherein the application executes in the trusted security zone of the processor based on the request.

12. The system of claim 11, wherein the request indicates that the request is to be processed by the trusted security zone of the processor.

13. The system of claim 7, wherein the application sends an execution request to the sender to execute in the trusted security zone of the sender.

14. A method of accessing a memory disk drive, comprising:

transmitting, by a computer to a disk controller of a memory disk drive, a command to execute in a trusted security zone of the disk controller;

transmitting, by the computer to the disk controller, a request for confirmation that the disk controller is executing in the trusted security zone of the disk controller;

when a confirmation that the disk controller is executing in the trusted security zone of the disk controller is received, transmitting, by the computer to the disk controller, a command to access a trusted security zone portion of the memory disk drive; and commanding, by the computer, at least one of another peripheral device or a user interface device to not access a data bus of the computer and to execute an idling program to idle active applications or programs while the disk controller accesses the trusted security portion of the memory disk drive, wherein the at least one of the peripheral device or the user interface does not read from or write to the data bus while executing the idling program, and wherein the at least one of the peripheral device or the user interface device is not a party to a trusted data communication.

15. The method of claim 14, wherein a server computer transmits the command to the memory disk drive to execute in the trusted security zone of the disk controller.

16. The method of claim 14, wherein the confirmation comprises a trust token.

17. The method of claim 14, wherein the memory disk drive is installed in one of a desk top computer, a laptop computer, or a notebook computer.

18. The method of claim 14, wherein the memory disk drive further comprises a normal security portion.

19. The method of claim 14, wherein the trusted security zone of the disk controller comprises a separate physical portion of the disk controller.

20. The method of claim 14, wherein the trusted security zone of the disk controller comprises a virtual processor portion of the disk controller.

* * * * *